(12) United States Patent
Yuan et al.

(10) Patent No.: US 7,245,328 B2
(45) Date of Patent: Jul. 17, 2007

(54) APPARATUS AND METHOD FOR CONTROLLING EXTINCTION RATIO IN A LIQUID CRYSTAL POLARIZATION CONTROLLER OPTICAL SWITCH

(75) Inventors: Haijun Yuan, Pleasanton, CA (US); Ming Li, Pleasanton, CA (US); Song Peng, Pleasanton, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 10/173,290

(22) Filed: Jun. 17, 2002

(65) Prior Publication Data

US 2004/0051820 A1    Mar. 18, 2004

(51) Int. Cl.
*G02F 1/133* (2006.01)
(52) U.S. Cl. .............................. 349/33; 349/72; 349/34
(58) Field of Classification Search ................ 349/193, 349/33, 34, 72
See application file for complete search history.

(56) References Cited

U.S. PATENT DOCUMENTS

| | | | | |
|---|---|---|---|---|
| 5,040,896 A | * | 8/1991 | Moslehi | 356/453 |
| 5,946,116 A | * | 8/1999 | Wu et al. | 398/55 |
| 6,519,012 B1 | * | 2/2003 | Helbing et al. | 349/30 |
| 6,567,202 B2 | * | 5/2003 | Harris et al. | 359/249 |

\* cited by examiner

*Primary Examiner*—Toan Ton
(74) *Attorney, Agent, or Firm*—Patterson & Sheridan, LLP

(57) ABSTRACT

A polarization controller includes: a liquid crystal cell; a mechanism for determining a compensation voltage; and a voltage driving circuit for applying the compensation voltage to the liquid crystal cell, where the application of the compensation voltage optimizes an extinction ratio of the liquid crystal cell. The controller controls the extinction ratio using an applied voltage to compensate for temperature changes, liquid crystal cell gap variations, and other errors of the liquid crystal cell. This controller is aimed at liquid crystal devices used in a wide ambient temperature range and is also useful to compensate for the fabrication errors of the liquid crystal switches.

24 Claims, 8 Drawing Sheets

APPARATUS AND METHOD FOR CONTROLLING EXTINCTION RATIO IN A LIQUID CRYSTAL POLARIZATION CONTROLLER OPTICAL SWITCH

FIELD OF THE INVENTION

The present invention relates to optical switches utilized in optical communications systems. More particularly, the present invention relates to such switches that utilize liquid crystal cells to control the polarization of light.

BACKGROUND OF THE INVENTION

Liquid Crystal (LC) cells are used along with other optical elements in optical communication apparatuses to switch light along alternative optical pathways. In these apparatuses, LC cells usually serve as polarization controllers. The extinction ratio ($R_{ex}$) of polarization is the most important parameter for these controllers.

FIG. 1 shows the diagram of a typical LC cell 102 as may be used as a polarization controller within an optical switch. In this diagram, double-barbed arrows inscribed within circles represent p-polarized light that is polarized vertically within the plane of the page. Crosses inscribed within circles in FIG. 1 represent s-polarized light polarized perpendicularly to the plane of the page. An input light 104 having an initial linear polarization, which is assumed herein to be p-polarization, is incident upon the LC cell 102.

Upon passing through the cell 102, the light becomes output light 106. Without an applied voltage (that is, in the OFF state), the polarization of the light is switched (rotated by 90°) such that, nominally, all the output light becomes s-polarized output light 106s. However, due to imperfection of the cell, a small proportion of the light is the p-polarized output light 106p.

When voltage is applied to the cell 102 (the ON state) shown in FIG. 1, the polarization of the output light 106 nominally remains the same as that of the input light 104. Thus, most of the light is the p-polarized light 106p. Once again, however, due to imperfection of the cell, a small proportion of the light is the s-polarized output light 106s.

For clarity of presentation, the two output lights 106s and 106p shown in FIG. 1 are shown separated from one another. In practice, however, these two output lights overlap. The output light represented by a dashed line is the one of lesser intensity. If the liquid crystal cell 102 comprises a component within an optical switch, other components of the switch may be utilized to route the s-polarized output light 106s to a first destination and the p-polarized output light 106p to a second destination. Thus, unless the light of lesser intensity is minimized, either in the ON state or the OFF state, an undesirable portion of the light may be directed to an incorrect destination.

The extinction ratio, $R_{ex}$, of the cell 102 shown in FIG. 1 is defined by $$R_{ex} = 10 \log_{10}\left(\frac{I_s}{I_p}\right) \quad \text{Eq. 1}$$

where $I_s$ is the intensity of s-polarized output light 106s and $I_p$ is the intensity of p-polarized output light 106p. If the input light 104 is s-polarized instead of p-polarized, then the quantities $I_s$ and $I_p$ must be interchanged with one another in Eq. 1.

As the ambient temperature increases, the birefringence of the LC material generally decreases, leading to a different $R_{ex}$ in the OFF state. FIGS. 2A–2B show simulated curves of $R_{ex}$ versus applied voltage for a Twisted Nematic LC cell with a 6.8 μm thick of LC layer. The different curves represent $R_{ex}$ values at different temperatures. For instance, "T20", "T30", etc. indicate curves calculated for respective temperatures of 20° C., 30° C., etc. Assume that the OFF state of the cell 102 corresponds to an applied voltage of 0 V. Then, when the ambient temperature increases from 20° C. to 70° C., the $R_{ex}$ in the OFF state increases from 22.8 dB at 20° C. to 30 dB at 50° C., and then drops to 15.5 dB at 70° C. (see FIG. 2A). FIG. 2B shows the same curves exhibited in FIG. 2A, but at a wider range of voltages. If the ON state has an applied voltage of 4 V, then, as the temperature changes, the $R_{ex}$ in the ON state remains constant at around −50 dB (see FIG. 2B). The minus sign indicates that the p-polarized output light 106p is dominant in ON state.

During fabrication of an LC cell, the control of parameters cannot be ideal, so the parameters of each individual cell, such as cell gap, twist angle, etc., may vary. FIGS. 3A–3B show that the cell gap variation leads to different curves of $R_{ex}$ versus applied voltage. FIGS. 3A–3B show graphs of the simulated curves of $R_{ex}$ versus applied voltage for various Twisted Nematic liquid crystal cells with different LC thickness and twist angle. The different curves in each of FIG. 3A and FIG. 3B represent $R_{ex}$ values for cells having different cell gaps. For instance, "d65", "d68, "d70" and "d72" represent curves for cells having gaps of 6.5° μm, 6.8° μm, 7.0° μm and 7.2° μm, respectively. Comparison between FIGS. 3A and 3B shows that twist angle variation also leads to different curves of $R_{ex}$ versus applied voltage.

Because, in general, a liquid crystal cell will output some light that is polarized orthogonal to the desired dominant polarization, an undesirable portion of the output light may be directed to an incorrect destination. Further, since the extinction ratio can vary with temperature within a single cell and can vary between cells, depending upon fabrication parameters, the amount of such mis-directed light is difficult to predict. This presents a problem in reproducibly fabricating optical switches based upon liquid crystal devices and in ensuring stable operation of the switches.

Accordingly, there exists a need for an improved liquid crystal cell apparatus. The improved apparatus should be made to operate at an optimum extinction ratio, regardless of temperature variations and cell-to-cell variations. The present invention addresses such a need.

SUMMARY OF THE INVENTION

A polarization controller includes: a liquid crystal cell; a mechanism for determining a compensation voltage; and a voltage driving circuit for applying the compensation voltage to the liquid crystal cell, where the application of the compensation voltage optimizes an extinction ratio of the liquid crystal cell. The controller controls the extinction ratio using an applied voltage to compensate for temperature changes, liquid crystal cell gap variations, and other errors of the liquid crystal cell. This controller is aimed at liquid crystal devices used in a wide ambient temperature range and is also useful to compensate for the fabrication errors of the liquid crystal switches.

DETAILED DESCRIPTION

The present invention provides an improved liquid crystal cell apparatus. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention discloses apparatuses and methods that enable compensation for extinction ratio ($R_{ex}$) variations in optical switches, wherein such variations might be caused by ambient temperature changes or by variations in the fabrication process of LC cells. To more fully appreciate the features and advantages of the present invention, the reader is referred to FIGS. 4–6B of the accompanying drawings in conjunction with the following discussion.

Figure 5A:
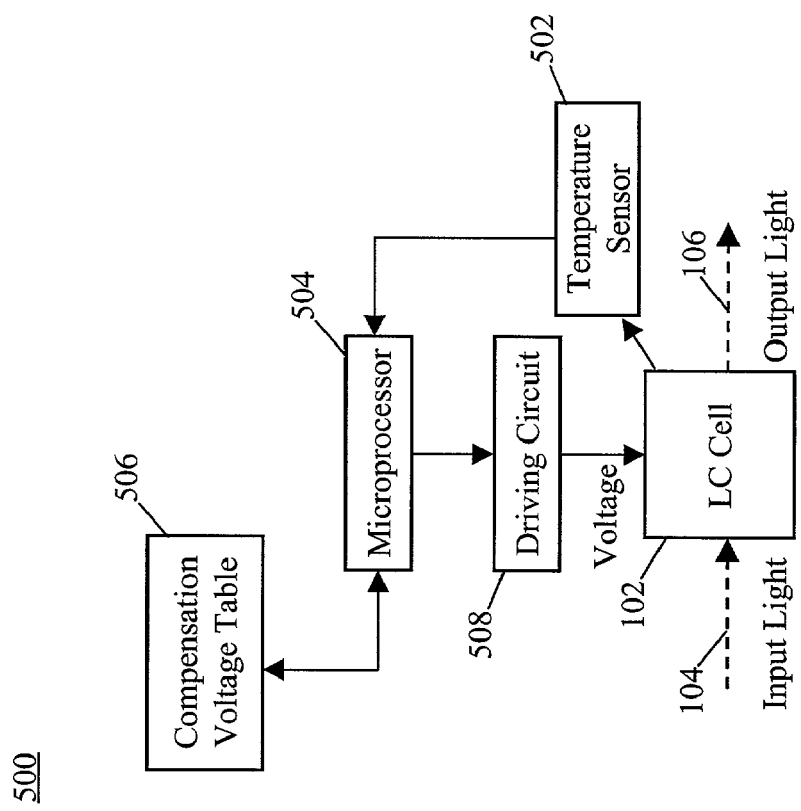
FIGS. 5A–5B illustrate two different liquid crystal polarization controller apparatuses, in accordance with the present invention, that maintain optimum extinction ratio through application of compensation voltages.
Figure 5B:
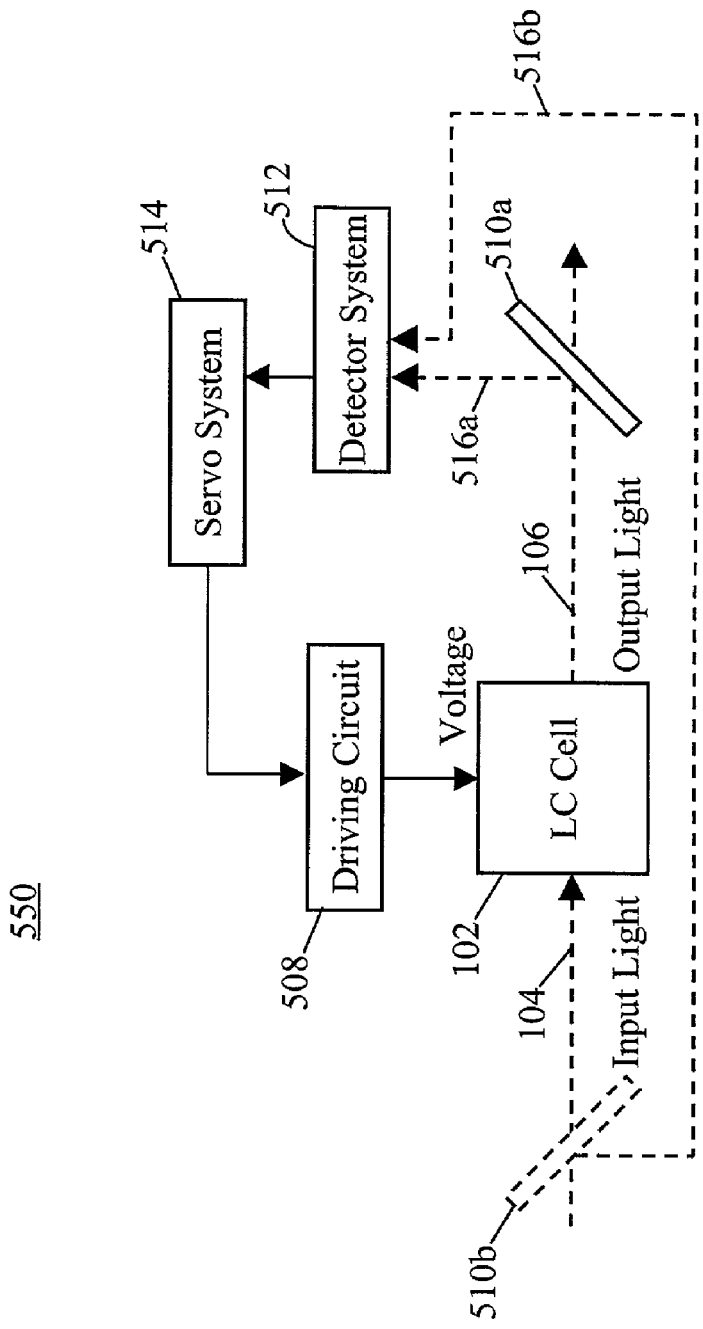

FIGS. 5A–5B illustrate two different preferred embodiments of LC polarization controller apparatuses, in accordance with the present invention, that maintain high extinction ratio through application of compensation voltages to the LC. The apparatus 500 (FIG. 5A) comprises an LC cell 102 that receives a polarized input light 104 and outputs a polarized output light 106, a temperature sensor 502 that is either physically coupled to or in close proximity to the LC cell 102, a microprocessor 504 electronically coupled to the temperature sensor 502, an electronic voltage driving circuit 508 electronically coupled to the microprocessor 504 and to the LC cell 102, and a machine readable compensation voltage table 506 that is electronically read by the microprocessor 504. The microprocessor 504 may be replaced by any other suitable electronic analog or digital logic processor or computer.

Figure 1:
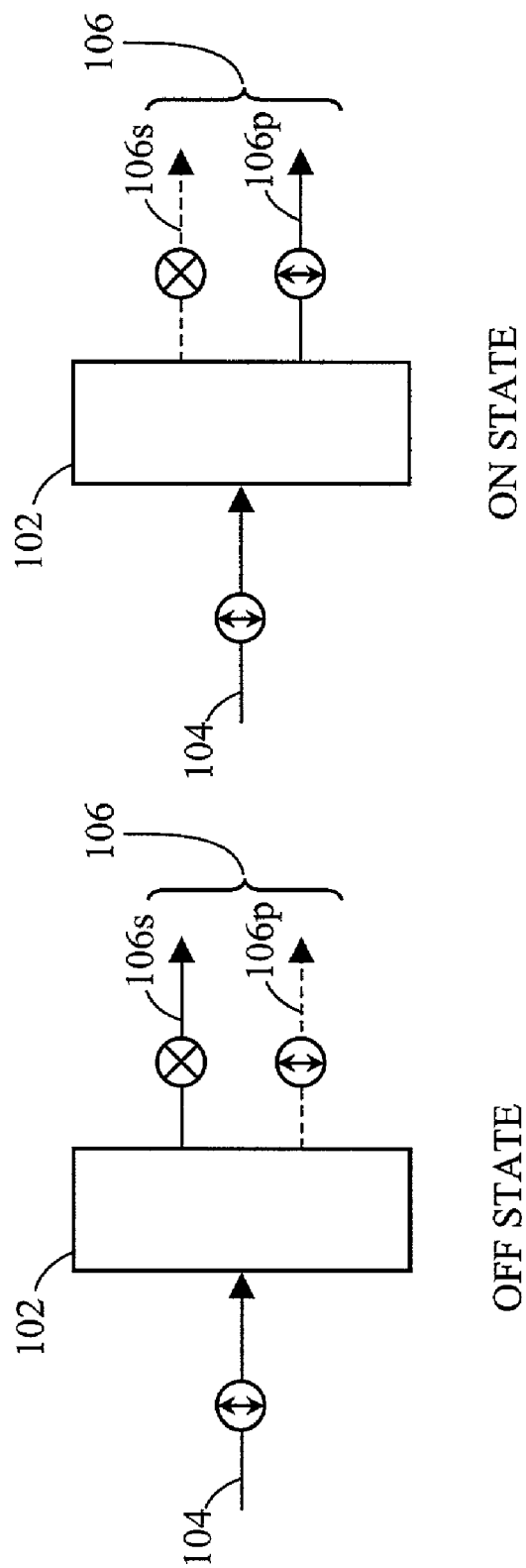
FIG. 1 shows the diagram of a typical optical switch using LC cells.
Figure 2B:
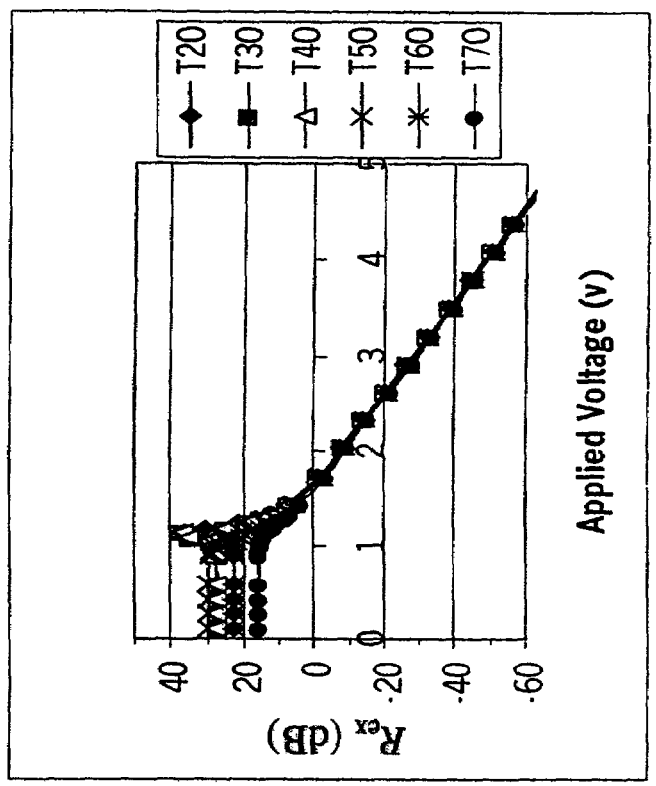
FIGS. 2A–2B show graphs of the simulated curves of $R_{ex}$ versus applied voltage at various temperatures for a Twisted Nematic liquid crystal cell with a 6.8 μm thick LC layer.
Figure 2A:
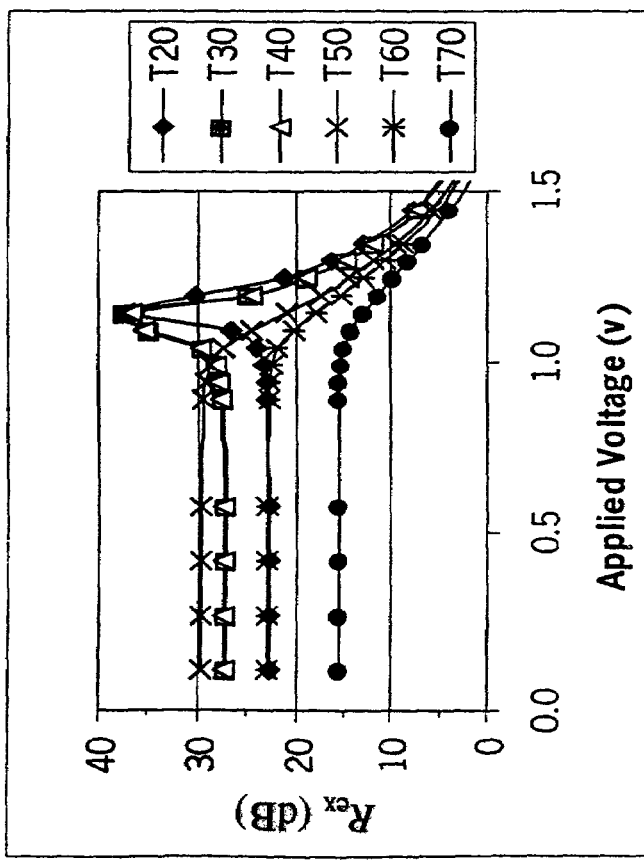
Figure 3B:
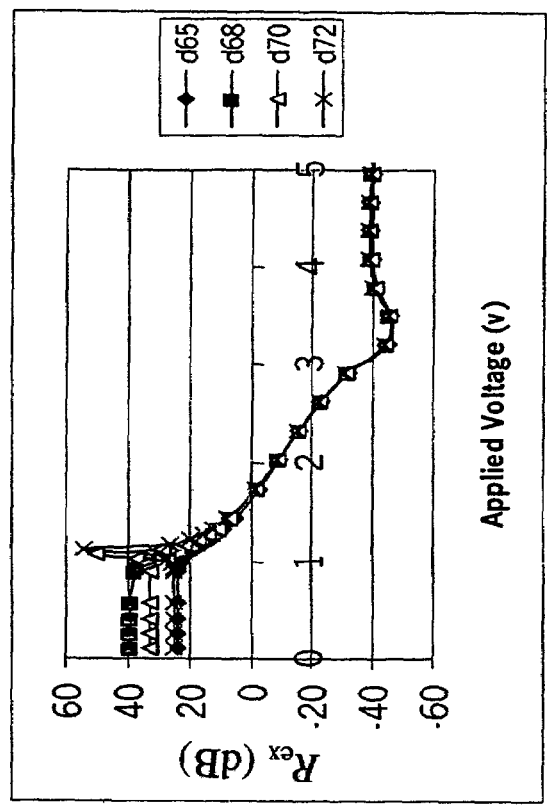
FIGS. 3A–3B show graphs of the simulated curves of $R_{ex}$ versus applied voltage for various Twisted Nematic liquid crystal cells with different LC thickness and twist angle.
Figure 3A:
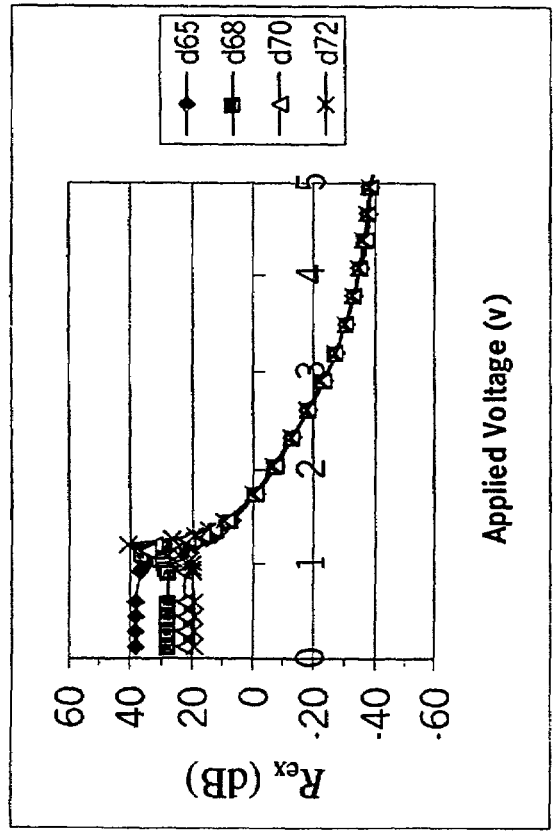
Figure 4:
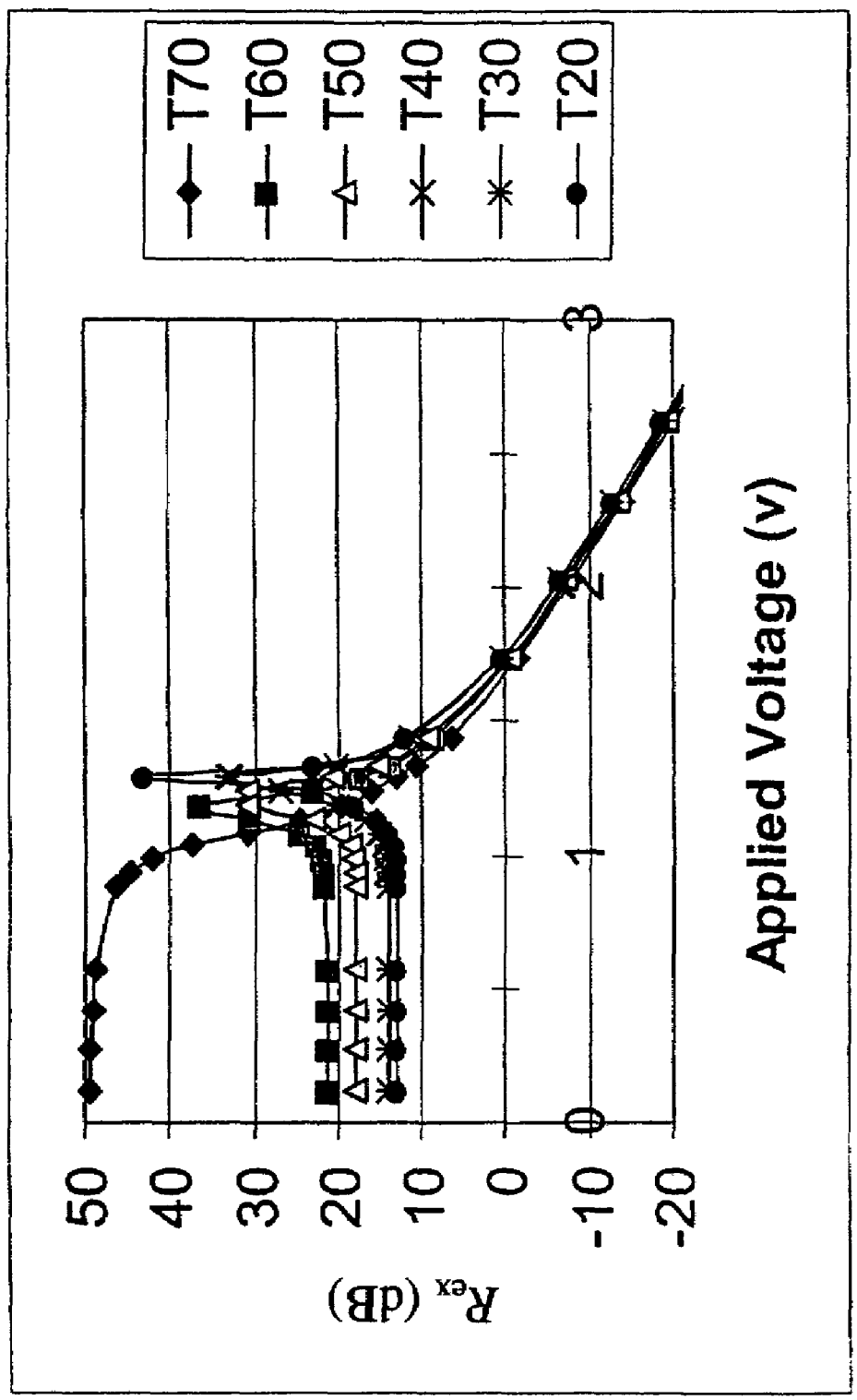
FIG. 4 shows graphs of the simulated curves of $R_{ex}$ versus applied voltage at various temperatures for a Twisted Nematic liquid crystal cell configured in accordance with the present invention.

Preferably, the LC cell 102 within the LC polarization controller 500 (FIG. 5A) and the polarization controller 550 (FIG. 5B) is constructed such that its highest $R_{ex}$ is achieved at the upper limit of the operating temperature and without any applied voltage. This property can be achieved by choosing an appropriate LC cell gap and appropriate refractive indices of the LC material during fabrication of the cell. FIG. 4 shows a typical electro-optic (EO) response of a cell with such a design. In this design, the operating temperature range is chosen, for example, to be 20° C.–70° C. When no voltage is applied, an LC cell 102 fabricated with this design achieves the highest $R_{ex}$ (50 dB) at the upper limit of the operating temperature (i.e., 70° C.). When the temperature decreases, the $R_{ex}$ drops. Advantageously, if the operating temperature is lower than the upper limit, then there always exists a particular applied voltage for that temperature that enables the LC polarization controller to reach a maximum $R_{ex}$. Frequently, the maximum $R_{ex}$ at any temperature in question will comprise an optimum $R_{ex}$ to be utilized at that temperature.

The compensation voltage table 506 of the apparatus 500 may contain a predetermined list of compensation voltages, tabulated against temperature, that should be applied to the LC cell to optimize the extinction ratio of the output light at any respective temperature. These compensation voltages are determined by the measured electro-optic (EO) response of the cell at various temperatures, an example of which is given in FIG. 4. The voltage compensation table 506 may also or alternatively be provided as a mathematical formula that is stored in either software or electronic firmware and calculated by the microprocessor 504, such that the formula receives a temperature and provides a compensation voltage in response.

The temperature sensor 502 of the apparatus 500 measures the temperature of the LC cell or of its environs (i.e., the ambient temperature). This temperature is read by the microprocessor 504 and is compared to entries in the compensation voltage table 506 or else is entered into a formula stored in that table. As a result of this table entry retrieval or formula calculation, the microprocessor 504 determines a best compensation voltage to apply across the LC cell 102 so as to optimize the extinction ratio at that temperature. The voltage driving circuit 508 applies the determined voltage to the LC cell 102. The compensation voltage may be applied in addition to any other operating voltage applied to the LC cell, such as the voltage required to place the cell in its "ON" state. The optimization may be such as to either maximize or minimize the extinction ratio, depending upon whether the cell 102 is in its ON state or OFF state and upon how the extinction ratio is defined.

The polarization controller apparatus 550 (FIG. 5B) comprises an LC cell 102 that receives a polarized input light 104 and outputs a polarized output light 106, a beam splitter 510a disposed within the path of the output light 106 so as to divert a small sampled proportion 516a of the output light, a detector system 512 optically coupled to the beam splitter 510a and receiving the sampled proportion 516a, a servo system 514 electronically coupled to the detector system 512 and a voltage driving circuit 508 electronically coupled to the servo system 514 and to the LC cell 102. The apparatus 550 may also comprise an optional second beam splitter 510b disposed within the path of the input light 104 so as to divert a small sampled proportion 516b of the input light to the detector system 512.

The detector system 512 measures the extinction ratio of the sampled proportion 516a of the output light 106 and, optionally, the intensity of the sampled proportion 516b of the input light. The extinction ratio of the sampled proportion 516a or the ratio of the two sampled proportions 516a–516b is related to the extinction ratio of the output light 106. Preferably, the detector system 512 comprises a means—such as a polarization beam splitter or birefringent crystal—to separate the s-polarized and the p-polarized light and comprises a separate photo-detector for each such light. The detector system 512 may also comprise electronic logic (not shown) to correct the detected intensities of the s-polarized and p-polarized light output for any intensity variations in the input light 104. The latter variations may determined through optional monitoring of the sampled proportion 516b of the input light.

Based upon the measurements and corrections described above, the detector system 512 provides a correction signal to the servo system 514. The servo system 514 then controls the voltage driving circuit 508 so as to provide a voltage to the LC cell 102 that optimizes the measured extinction ratio, wherein the extinction ratio is determined from the sampled proportion 516a and, optionally, from the sampled proportion 516b.

Figure 6A:
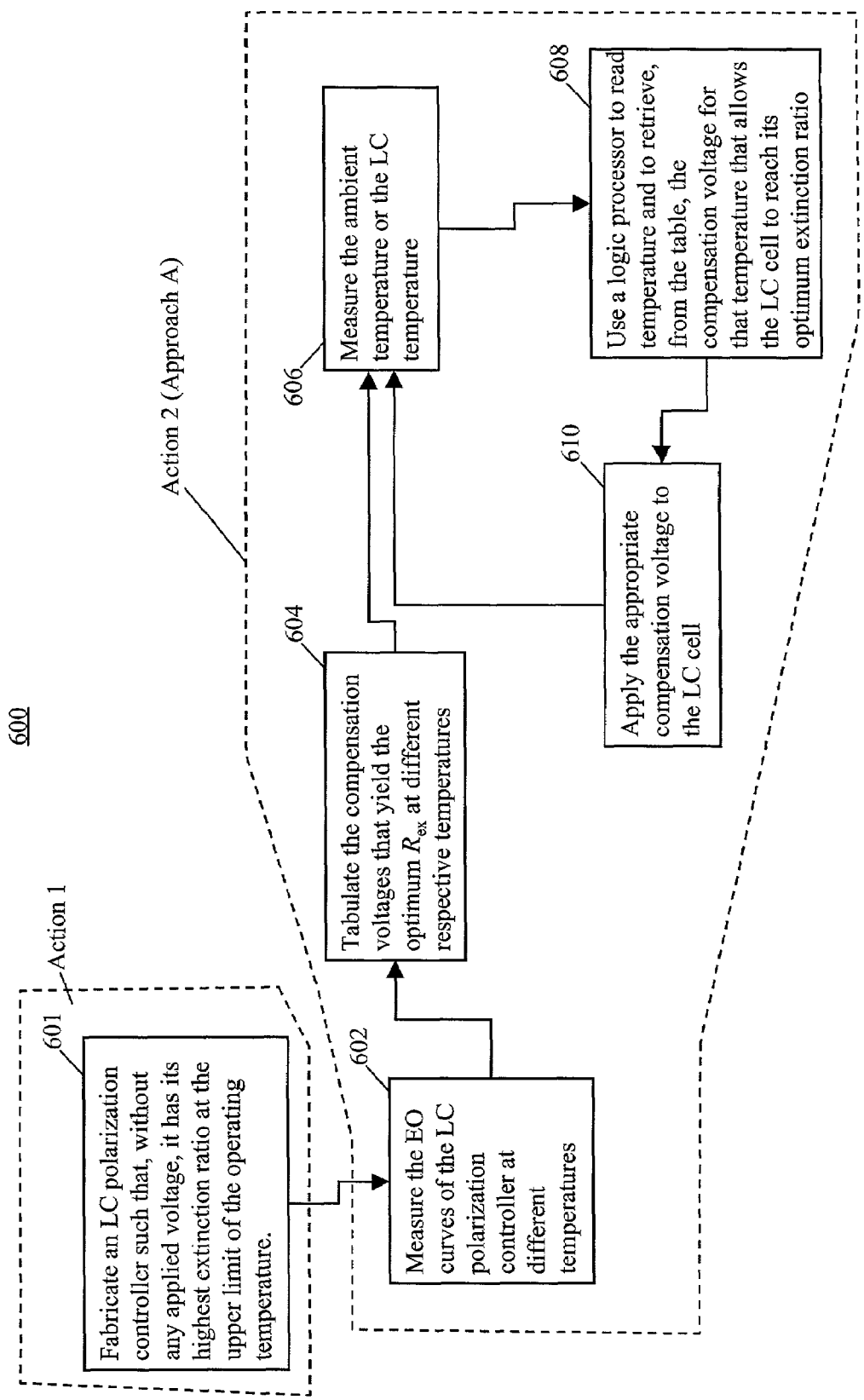
FIGS. 6A–6B illustrate two different methods, in accordance with the present invention, for maintaining optimum extinction ratios of LC polarization controller devices.
Figure 6B:
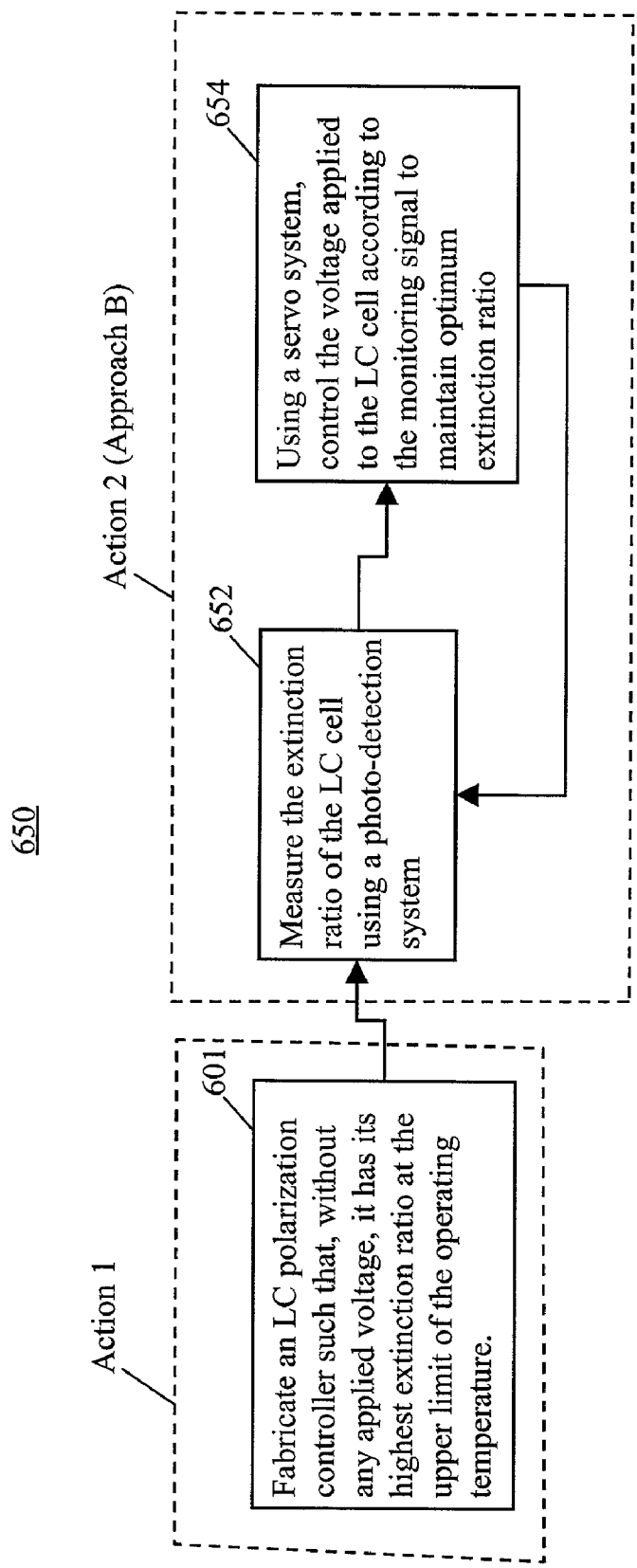

FIGS. 6A–6B illustrate two different preferred embodiment of methods, in accordance with the present invention, for maintaining optimum extinction ratios of LC polarization controller devices through the application of compensation voltages to the devices. The method 600 illustrated in FIG. 6A and the alternative method 650 illustrated in FIG. 6B both include the following actions:

Action 1: Design the LC polarization controller 500 or 550 such that its highest $R_{ex}$ is achieved at the upper limit of the operating temperature and without any applied voltage, such as shown in FIG. 4. This corresponds to step 601 in both method 600 and method 650.

Action 2: Apply a compensation voltage to reach optimum $R_{ex}$. The methods 600 and 650 differ in their respective approaches to achieving this action. Approach A corresponds to the steps 602–610 in the method 600 (FIG. 6A) whereas approach B corresponds to the steps 652–654 in the method 650 (FIG. 6B).

Approach A (FIG. 6A), utilized in apparatus 500 (FIG. 5A), comprises the following steps: Measure the EO curves of the LC polarization controller 500 for different temperatures in Step 602; Tabulate the compensation voltages which enable the LC polarization controller 500 to reach the optimum $R_{ex}$ at different temperatures in Step 604; Use a temperature sensor 502 to measure the ambient temperature or the LC temperature in Step 606; Use a microprocessor 504 or other logic processor or computer to check the tabulated compensation voltages according to the measured temperature in Step 608; and Apply the appropriate compensation voltage to the LC cell 102 to reach optimum $R_{ex}$ for any temperature in the operating range in Step 610. Steps 601, 602 and 604 of method 600 are preparatory in nature and occur during fabrication of the LC cell 102 and prior to putting an LC cell 102 into operation. Steps 606–610 comprise a repeating loop that occurs when an LC cell 102 is in operation. The compensation voltage may be applied in addition to any other operating voltage applied to the LC cell 102, such as the voltage required to place the cell in its "ON" state.

Approach B (FIG. 6B), utilized by the apparatus 550 (FIG. 5B), comprises the following steps: Use a photodetection system 512 to measure the $R_{ex}$ of the LC cell 102 in Step 652; and Use a servo system 514 to control applied voltage to the LC cell 102 according to the monitoring signal 516a in step 654 to maintain optimum $R_{ex}$ automatically. Step 601 of method 650 is preparatory in nature and occurs during fabrication of the LC cell 102. Steps 652–654 comprise a repeating loop that occurs when an LC cell 102 is in operation.

Fabrication errors, such as cell gap error and twist angle errors, are compensated automatically by Approach B utilized in method 650. If Approach A of method 600 is used, the EO response of each individual device needs to be measured for different temperatures in order to compensate for all fabrication errors.

An improved apparatus and a method for controlling the extinction ratio of a liquid crystal cell have been disclosed. Although the embodiments shown here include a transmissive Twisted Nematic LC switch, the concept of controlling $R_{ex}$ via compensation voltages can also be applied to other transmissive and reflective LC switches without departing from the spirit and scope of the present invention. Although the present invention has been described in accordance with the embodiments shown and discussed, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A polarization controller, comprising:
   a liquid crystal cell;
   a means for determining a compensation voltage, comprising:
      a detector system,
      a beam splitter optically coupled to the liquid crystal cell and the detector system for diverting a portion of an output light from the liquid crystal cell to the detector system wherein the detector system measures an extinction ratio of the diverted portion of the output light, and
      a servo system coupled to the detector system for determining the compensation voltage based on the measured extinction ratio; and
   a voltage driving circuit for applying the compensation voltage to the liquid crystal cell, wherein the application of the compensation voltage optimizes the extinction ratio of the liquid crystal cell, wherein the polarization controller is fabricated such that, without any applied voltage, it has its highest extinction ratio at an upper limit of an operating temperature.

2. The controller of claim 1, wherein the optimal extinction ratio is approximately a maximum extinction ratio for the liquid crystal cell, if the liquid crystal cell is in a non-polarization rotating state.

3. The controller of claim 1, wherein the optimal extinction ratio is approximately a minimum extinction ratio for the liquid crystal cell, if the liquid crystal cell is in a polarization rotating state.

4. The controller of claim 1, wherein the detector system comprises:
   a means for separating the diverted portion of the output light into a first polarized light and a second polarized light; and
   a plurality of photodetectors for the first and second polarized lights.

5. The controller of claim 4, wherein the separating means comprises a polarization beam splitter.

6. The controller of claim 4, wherein the separating means comprises a birefringent crystal.

7. The controller of claim 4, wherein the plurality of photodetectors comprises a first photodetector for the first polarized light and a second photodetector for the second polarized light.

8. The controller of claim 4, further comprising:
   an electronic logic for correcting detected intensities of the first and second polarized lights.

9. The controller of claim 1, further comprising:
a second beam splitter optically coupled to the liquid crystal cell for diverting a portion of an input light to the liquid crystal cell to the detector system.

10. The controller of claim 1, wherein the optimal extinction ratio is approximately a maximum extinction ratio for the liquid crystal cell if the liquid crystal cell is in a non-polarization rotating state and approximately a minimum extinction ratio for the liquid crystal cell if the liquid crystal cell is in a polarization rotating state.

11. A polarization controller, comprising:
a liquid crystal cell;
a detector system, comprising a means for measuring an extinction ratio for a diverted portion of an output light;
a beam splitter optically coupled to the liquid crystal cell and the detector system for diverting the portion of the output light from the liquid crystal cell to the detector system;
a servo system coupled to the detector system for determining a compensation voltage based on the measured extinction ratio for the diverted portion of the output light; and
a voltage driving circuit coupled to the servo system and the liquid crystal cell for applying the compensation voltage to the liquid crystal cell, wherein application of the compensation voltage optimizes an extinction ratio of the liquid crystal cell, wherein the polarization controller is fabricated such that, without any applied voltage, it has its highest extinction ratio at an upper limit of an operating temperature.

12. The controller of claim 11, wherein the optimal extinction ratio is approximately a maximum extinction ratio for the liquid crystal cell, if the liquid crystal cell is in a non-polarization rotating state.

13. The controller of claim 11, wherein the optimal extinction ratio is approximately a minimum extinction ratio for the liquid crystal cell, if the liquid crystal cell is in a polarization rotating state.

14. The controller of claim 11, wherein the detector system comprises:
a means for separating the diverted portion of the output light into a first polarized light and a second polarized light; and
a plurality of photodetectors for the first and second polarized lights.

15. The controller of claim 14, wherein the separating means comprises a polarization beam splitter.

16. The controller of claim 14, wherein the separating means comprises a birefringent crystal.

17. The controller of claim 14, wherein the plurality of photodetectors comprises a first photodetector for the first polarized light and a second photodetector for the second polarized light.

18. The controller of claim 14, further comprising:
an electronic logic for correcting detected intensities of the first and second polarized lights.

19. The controller of claim 11, further comprising:
a second beam splitter optically coupled to the liquid crystal cell for diverting a portion of an input light to the liquid crystal cell to the detector system.

20. A polarization controller, comprising:
a liquid crystal cell;
a detector system comprising a measuring member configured to measure an extinction ratio for a diverted portion of an output light, a separating member configured to separate the diverted portion of the output light into a first polarized light and a second polarized light and a plurality of photodetectors for the first and second polarized lights and an electronic logic configured to correct the detected intensities of the first and second polarized lights;
a beam splitter configured to divert the portion of the output light from the liquid crystal cell to the detector system;
a second beam splitter configured to divert a portion of an input light directed to the liquid crystal cell to the detector system;
a servo system coupled to the detector system for determining a compensation voltage based on the measured extinction ratio for the diverted portion of the output light; and
a voltage driving circuit configured to apply the compensation voltage to the liquid crystal cell in order to optimize an extinction ratio of the liquid crystal cell, wherein the voltage driving circuit is coupled to the servo system and the liquid crystal cell.

21. The controller of claim 20, wherein the optimal extinction ratio is approximately a maximum extinction ratio for the liquid crystal cell if the liquid crystal cell is in a non-polarization rotating state and approximately a minimum extinction ratio for the liquid crystal cell if the liquid crystal cell is in a polarization rotating state.

22. The controller of claim 20, wherein the optimal extinction ratio is approximately a maximum extinction ratio for the liquid crystal cell, if the liquid crystal cell is in a non-polarization rotating state.

23. The controller of claim 20, wherein the separating member comprises a polarization beam splitter.

24. A polarization controller, comprising:
a liquid crystal cell;
a detector system comprising a measuring member configured to measure an extinction ratio for a diverted portion of an output light, a separating member configured to separate the diverted portion of the output light into a first polarized light and a second polarized light and a plurality of photodetectors for the first and second polarized lights;
an electronic logic configured to correct the detected intensities of the first and second polarized lights;
a beam splitter configured to divert the portion of the output light from the liquid crystal cell to the detector system;
a servo system coupled to the detector system for determining a compensation voltage based on the measured extinction ratio for the diverted portion of the output light; and
a voltage driving circuit configured to apply the compensation voltage to the liquid crystal cell in order to optimize an extinction ratio of the liquid crystal cell, wherein the voltage driving circuit is coupled to the servo system and the liquid crystal cell, wherein the polarization controller is fabricated such that, without any applied voltage, it has its highest extinction ratio at an upper limit of an operating temperature.

* * * * *